(12) United States Patent
Chen et al.

(10) Patent No.: US 6,714,716 B2
(45) Date of Patent: *Mar. 30, 2004

(54) VARIABLE OPTICAL ATTENUATOR

(75) Inventors: Jian J Chen, Fremont, CA (US); Jianhua Wang, Saratoga, CA (US)

(73) Assignee: Optiwork, Inc., Fremont, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 10/184,553

(22) Filed: Jun. 28, 2002

(65) Prior Publication Data

US 2003/0044156 A1 Mar. 6, 2003

Related U.S. Application Data

(63) Continuation-in-part of application No. 09/812,358, filed on Mar. 19, 2001, now Pat. No. 6,580,868.

(51) Int. Cl.[7] .............................. G02B 6/00; G02B 26/02
(52) U.S. Cl. ...................... 385/140; 359/227; 359/236
(58) Field of Search ........................ 385/140; 359/227, 359/236, 226

(56) References Cited

U.S. PATENT DOCUMENTS

| | | | | |
|---|---|---|---|---|
| 3,226,557 A | * | 12/1965 | Goodman | 359/227 |
| 3,633,993 A | * | 1/1972 | Goldberg | 359/238 |
| 5,226,104 A | * | 7/1993 | Unterleitner et al. | 385/140 |
| 5,946,435 A | * | 8/1999 | Zheng et al. | 385/47 |
| 6,415,067 B1 | * | 7/2002 | Copner et al. | 385/16 |
| 2002/0061179 A1 | * | 5/2002 | Morimoto et al. | 385/140 |

* cited by examiner

Primary Examiner—Edward J. Glick
Assistant Examiner—Krystyna Suchecki
(74) Attorney, Agent, or Firm—Andrei D. Popovici

(57) ABSTRACT

A mechanically-adjustable variable optical attenuator includes an azimuthally-tapering, rotatable beam attenuator. In a plane perpendicular to the light beam to be attenuated, the projection of the beam attenuator comprises a sharp distal tip, a proximal region, and a concave curved light-blocking surface narrowing from the proximal region to the distal tip. The extent of the beam attenuator obstructing the light beam is varied by rotating the beam attenuator about a rotation axis perpendicular to the light beam direction. The beam attenuator geometry allows achieving high resolutions while limiting the beam attenuator size. The attenuated light beam can be a single-mode or multi-mode light beam.

13 Claims, 11 Drawing Sheets

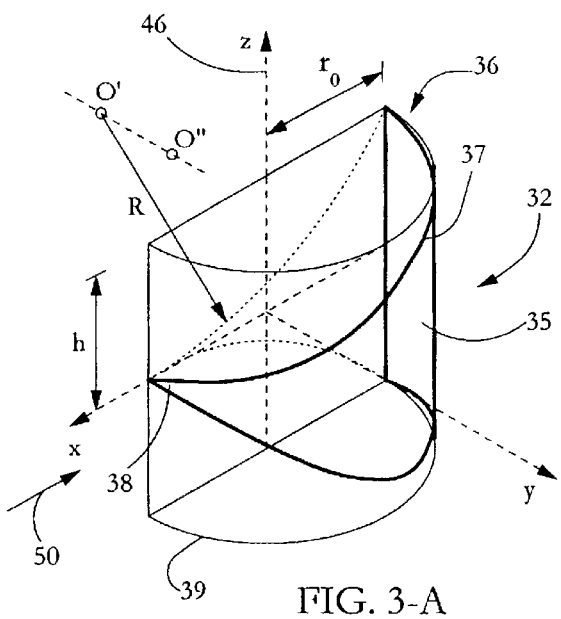
FIG. 3-A
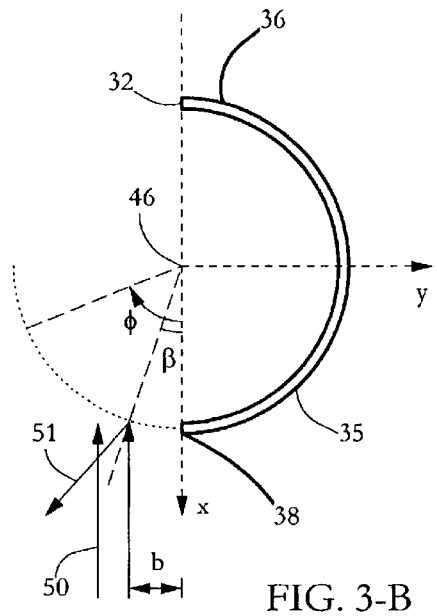
FIG. 3-B
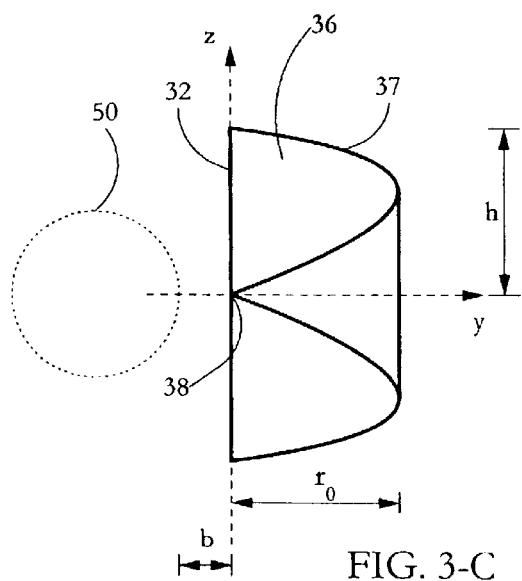
FIG. 3-C
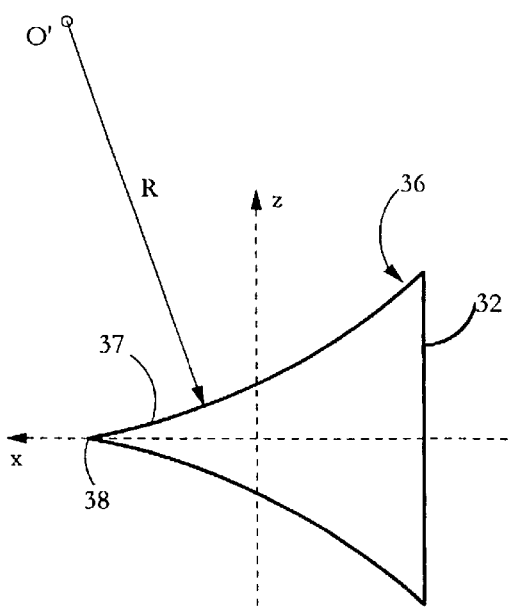
FIG. 3-D

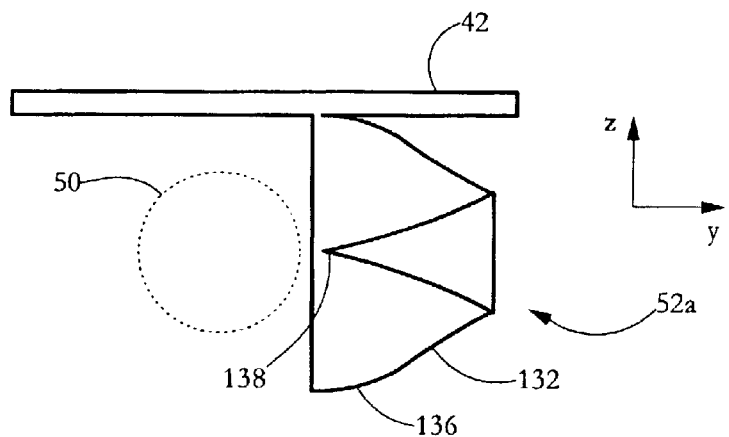
FIG. 4-A
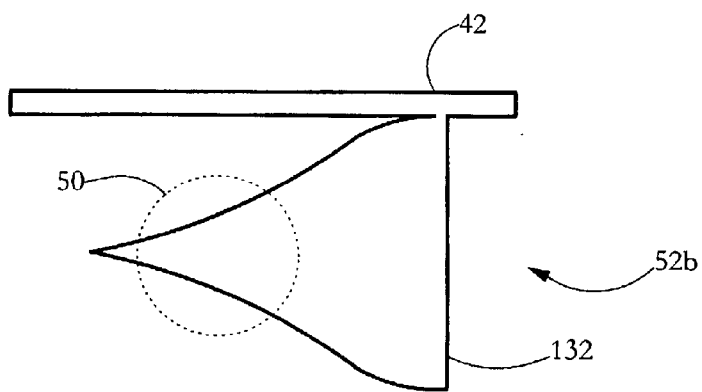
FIG. 4-B
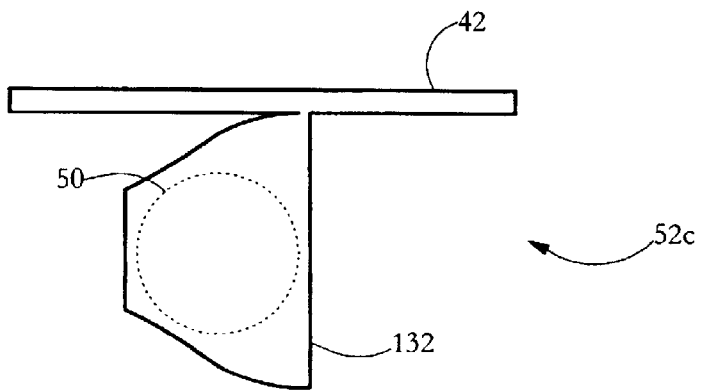
FIG. 4-C

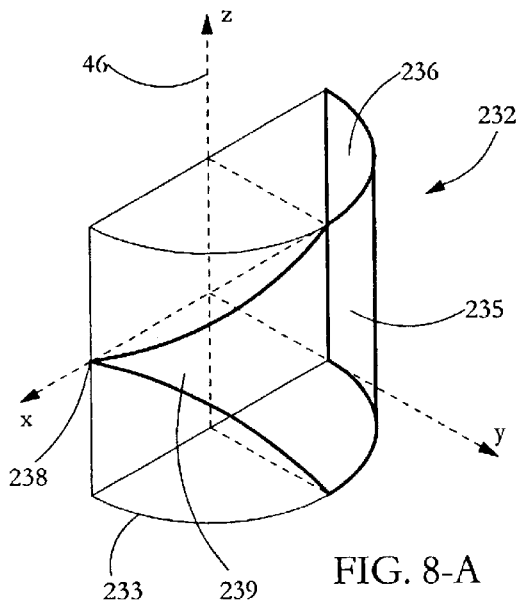
FIG. 8-A
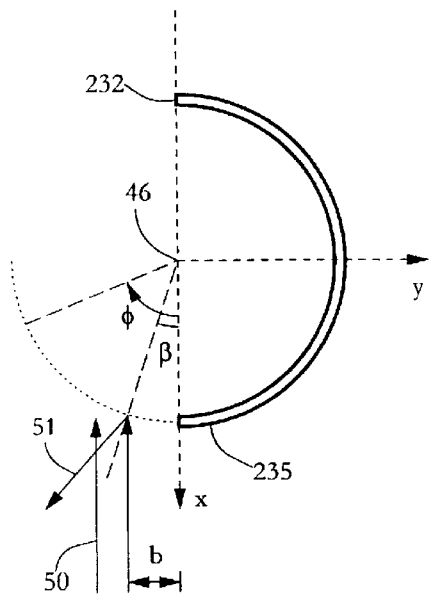
FIG. 8-B
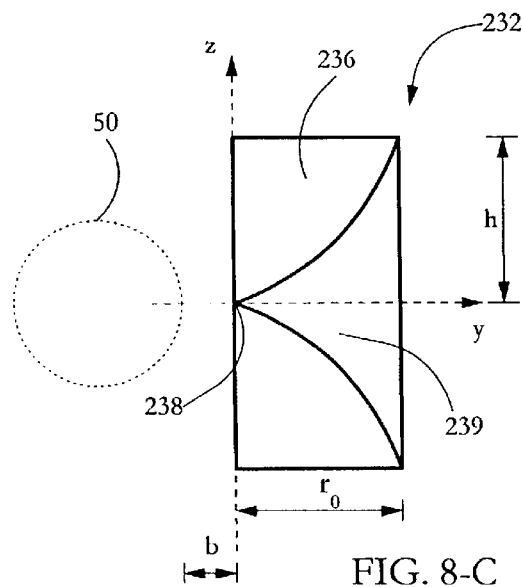
FIG. 8-C
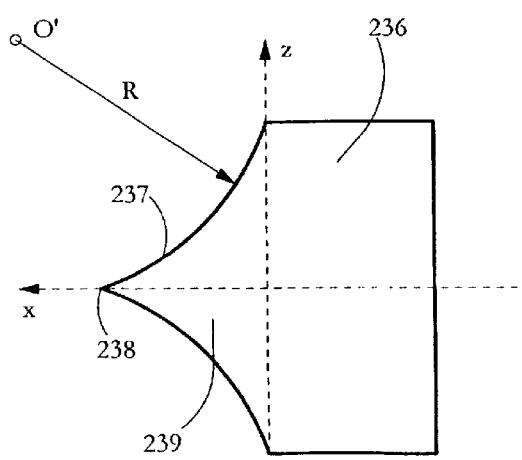
FIG. 8-D

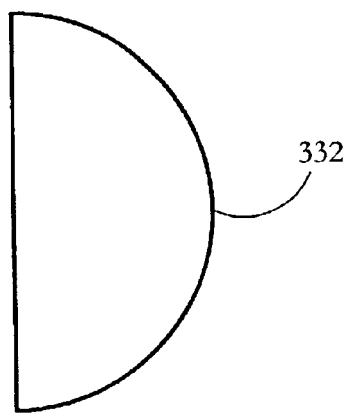
FIG. 12-A
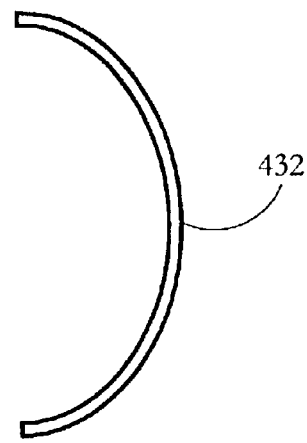
FIG. 12-B
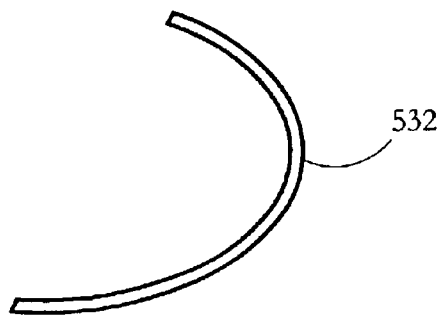
FIG. 12-C

VARIABLE OPTICAL ATTENUATOR

RELATED APPLICATION DATA

This application is a Continuation-in-Part of U.S. patent application Ser. No. 09/812,358, filed Mar. 19, 2001, now U.S. Pat. No. 6,580,868 which is assigned to the assignee of the present invention and is herein incorporated by reference.

BACKGROUND OF THE INVENTION

This invention relates to optical attenuators, in particular to variable optical attenuators with mechanical adjustment.

Variable optical attenuators are used to attenuate light beams in optical systems such as fiber optic communication systems. Controllably attenuating a light beam can be achieved by various methods, such as by passing the beam through a variable-attenuation (e.g. wedge-shaped) filter, radially bending a fiber loop to vary the optical loss within the loop, thermally changing the refractive index of cladding material, and partially blocking the beam by inserting a beam block into the light beam path.

Beam-blocking attenuators can act in a wavelength- and polarization-independent manner, and can have high reliability and repeatability. In addition, beam-blocking attenuators allow wide attenuation ranges, and can be relatively easy to manufacture. At the same time, beam-blocking attenuators can be relatively bulky. Moreover, achieving high resolutions with beam-blocking attenuators may require very fine (micron-level) mechanical control or tolerances.

In U.S. Pat. No. 6,167,185, Smiley et al. disclose an optical attenuator for attenuating a light beam while preserving the polarization of the light beam. The optical attenuator includes a beam attenuator for attenuating the light beam when disposed within the path of the light beam. The beam attenuator has a cross-section along a plane perpendicular to the direction of propagation of the light beam in the shape of a wedge. Smiley et al. teach that the disclosed attenuator preserves the polarization composition of the light beam over a large attenuation range. At the same time, the resolution of the attenuator described by Smiley et al. can be limited for a given beam attenuator size and precision of motion.

SUMMARY OF THE INVENTION

The present invention provides a variable optical attenuator for attenuating a longitudinal light beam, comprising a generally transverse beam attenuator for attenuating the light beam, the beam attenuator having a proximal end, a distal tip, and a concave curved light-blocking surface extending between the proximal end and the distal tip, the blocking surface narrowing from the proximal region to the distal tip. A control device is coupled to the beam attenuator, for controlling a motion of the beam attenuator so as to vary an attenuation of the light beam caused by the beam attenuator. The optical attenuator has a variable resolution depending on an extent of the blocking surface blocking the light beam. The inwardly-curved boundary of the light-blocking surface allows improved attenuation resolutions relative to a conical light-blocking surface of the same overall size. The light beam can be a single- or multi-mode laser beam.

BRIEF DESCRIPTION OF THE DRAWINGS

The foregoing aspects and advantages of the present invention will become better understood upon reading the following detailed description and upon reference to the drawings where:

FIGS. 3-A through 3-D show a beam attenuator according to the presently preferred embodiment of the present invention.

FIGS. 4-A through 4-C show a beam attenuator in three positions relative to a light beam, respectively, according to the present invention.

FIGS. 8-A–D show a beam attenuator according to another embodiment of the present invention.

FIGS. 12-A–C illustrate alternative beam attenuator geometries according to the present invention.

DETAILED DESCRIPTION OF THE INVENTION

In the following description, the term "longitudinal" is understood to refer to the direction of the light beam at the beam attenuator location. The term "transverse" is understood to refer a direction transverse to the longitudinal light beam direction. A "distal tip" at an end of a narrowing beam attenuator is understood to be at the narrower end of the beam attenuator. A light-blocking surface is understood to be a surface that does not permit the passage of light therethrough, such as a reflective or absorbing surface. The term "light-blocking surface" may encompass both a beam attenuator outer surface struck by the light beam, and a projection of that surface on a plane perpendicular to the light beam direction. Unless otherwise explicitly specified, any recited element may be formed monolithically from a single piece, assembled from multiple monolithic pieces, or be part of a larger monolithic piece. For example, a beam attenuator can be formed by a monolithic piece, an assembly, or part of a larger monolithic piece. Unless otherwise stated, the statement that two axes are perpendicular does not require that the two axes intersect; for example, a first axis parallel to the y-axis can be perpendicular to the x-axis even if the first axis does not intersect the x-axis.

The following description illustrates embodiments of the invention by way of example and not necessarily by way of limitation.

Figure 1:
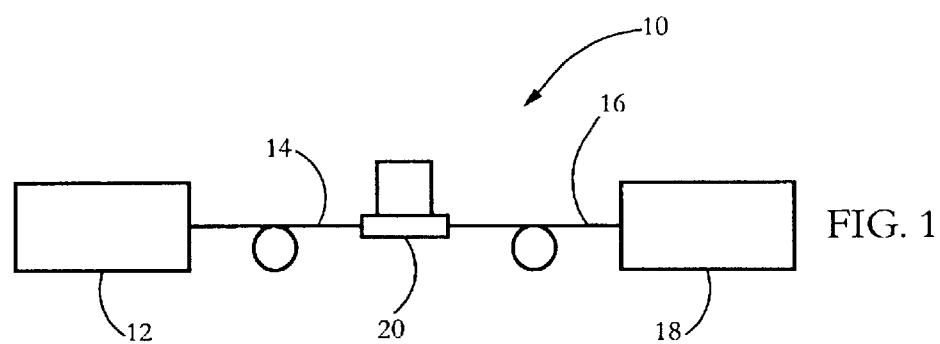
FIG. 1 is a schematic diagram of an optical system including a variable optical attenuator of the present invention.

FIG. 1 shows a schematic diagram of an optical system 10 including a variable optical attenuator 20 of the present invention. Optical system 10 can be for example an optical communications system. Optical system 10 includes an optical source 12 and an optical receiver 18 in optical communication with optical attenuator 20 over corresponding input and output optical links such as optical fibers 14, 16, respectively. Source 12 directs a light beam through input fiber 14 to optical attenuator 20, and receiver 18 receives the light beam after passage through optical attenuator 20 and output fiber 16.

Figure 2:
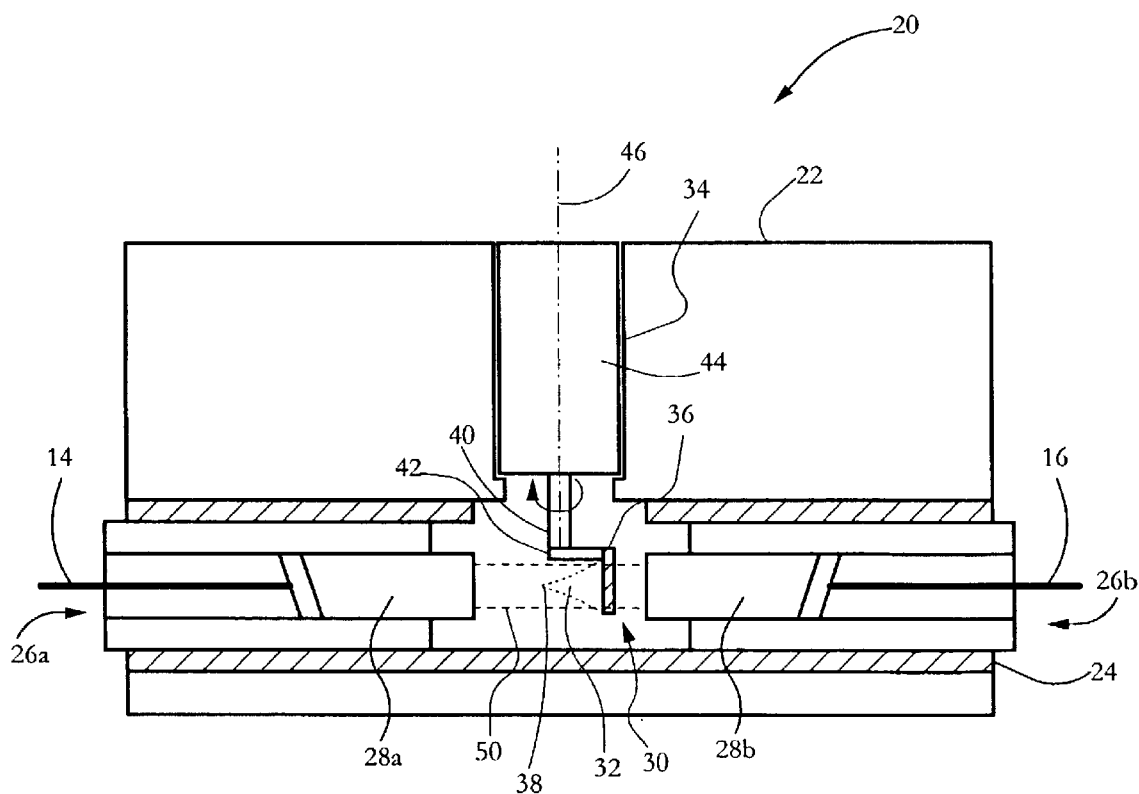
FIG. 2 schematically illustrates a variable optical attenuator according to the presently preferred embodiment of the present invention.

FIG. 2 shows a longitudinal sectional view through optical attenuator 20, according to the preferred embodiment of the present invention. Optical attenuator 20 includes an external housing 22 enclosing the internal components of optical attenuator 20. A longitudinal cylindrical tube 24 is mounted and extends though housing 22. Conventional input and output optical fiber collimators 26a–b are mounted at opposite longitudinal ends of tube 24. Collimators 26a–b are maintained by cylindrical tube 24 in a co-linearly aligned position. Tube 24 maintains the alignment of collimators 26a–b in the presence of temperature variations.

Input collimator 26a is connected to input fiber 14, and transmits light received from input fiber 14 toward output collimator 26b. The light extending from input collimator 26a to output collimator 26b is illustrated in FIG. 2 as a light beam 50. Output collimator 26b is connected to output fiber 16, and directs light beam 50 into output fiber 16. As is apparent to the skilled artisan, input and output collimators 26a–b include conventional input and output lenses 28a–b, respectively. For example, lenses 28a–b can be GRIN, C, or D-lenses, or any other type of suitable lenses.

An attenuation chamber 30 is defined by the longitudinal spacing between collimators 26a–b. Chamber 30 is capable of receiving a generally transverse beam attenuator 32, for variably attenuating light beam 50. Beam attenuator 32 defines a light-blocking surface having a proximal region or end 36, a distal tip 38, and two symmetric, inward-curving edges extending between proximal region 36 and distal tip 38. Beam attenuator 32 is preferably shaped as an azimuthally-tapering, concave-edged cylinder section, as described in more detail below.

Beam attenuator 32 is rigidly connected at proximal end 36 to a motor shaft 40 of a motor 44. Motor 44 is held in a fixed position in an aperture 34 defined in housing 22. Motor 44 can be affixed to housing 22 by an adhesive or a fastener such as a set screw. Motor 44 can include a DC servo motor or a stepper motor and associated driving electronics. Beam attenuator 32 is connected to shaft 40 through a disk-shaped rigid coupling part 42. Shaft 40 is generally transverse, and is capable of rotation about its central axis 46. Central axis 46 is perpendicular to the direction of light beam 50. Operating motor 44 to rotate shaft 40 causes beam attenuator to block light beam 50 to an extent determined by the angle of rotation of shaft 40.

Motor 44, shaft 40, and coupling part 42 serve as a control device coupled to beam attenuator 32, for controlling the rotation of beam attenuator 32 so as to vary the attenuation imparted by beam attenuator 32 to light beam 50. Generally, a control device may include a manual coupling interface for allowing manual control of the position of beam attenuator 32. In a present implementation, beam attenuator 32 is made of aluminum coated with black anodization. Housing 22 can be made of anodized aluminum, brass, or other known materials.

To make optical attenuator 20, collimators 26a–b are mounted within cylindrical tube 24. Collimators 26a–b are co-linearly aligned in order to minimize the insertion loss of optical attenuator 20, and are then soldered in place. The assembly formed by cylindrical tube 24 and collimators 26a–b is then mounted in a longitudinal aperture of housing 22. Beam attenuator 32 is connected to motor shaft 40 via coupling part 42. The entire assembly including beam attenuator 32, motor 44, motor shaft 40, and coupling part 42 is then slid into guiding aperture 34 and fixed to housing 22 in the desired position. An adhesive such as glue or epoxy is preferably applied around motor 44, in order to prevent moisture from getting into chamber 30. Cylindrical tube 24 is then epoxied to housing 22.

To operate optical attenuator 20, a user or control system controls motor 44 to rotate motor shaft 40. Beam attenuator 32 then rotates about axis 46. The azimuthal position of beam attenuator 32 determines the extent to which beam attenuator 32 obstructs the passage of light beam 50 from input collimator 26a to output collimator 26b. The range of motion, length, width, and curvature of beam attenuator 32 are chosen to achieve desired attenuation characteristics as a function of azimuthal position, as described in more detail below.

FIG. 3-A shows a three-dimensional view of beam attenuator 32 according to one variation of the present invention. FIGS. 3-B, 3-C, and 3-D show corresponding projections of beam attenuator 32 onto the xy, yz, and zx planes, respectively. The x-axis denotes the direction of propagation of light beam 50, while the z-axis denotes the axis of rotation 46 of beam attenuator 32. Beam attenuator 32 is preferably shaped as an azimuthally-tapering, concave-edged cylinder section defined by part of a half-cylinder 39 of radius $r_0$. Beam attenuator 32 may form part of a hollow cylindrical shell (as shown in FIGS. 3-A–B), or part of a solid cylinder. Beam attenuator 32 preferably extends over an 180° ($\pi$) span of an arc of a circle centered at rotation axis 46 and passing through the xy-plane projection of tip 38 and the opposite end of proximal region 36.

The extent of beam attenuator 32 along the z-axis (rotation axis 46) tapers azimuthally in a continuous manner, from a maximum width of 2 h at the end of proximal region 36 to a minimal width approaching zero at distal tip 38. Between proximal region 36 and distal tip 38, beam attenuator 32 is bounded by two concave, inwardly curving edges 37 situated symmetrically with respect to the x-axis. Edges 37 are defined by the intersection of half-cylinder 39 and a cylinder of radius R centered around an axis O'–O" parallel to the y-axis, as illustrated in FIGS. 3-A and 3-D.

As shown in FIG. 3-B, beam attenuator 32 is separated from beam 50 by a distance b when beam attenuator 32 is in an orientation corresponding to a minimal (e.g. zero) attenuation to be imposed on beam 50. The distance b is preferably chosen such that the smallest incident angle $\beta$ formed between light beam 50 and blocking surface 35 is larger than about 8°:

$$\beta = \sin^{-1}\left(\frac{b}{r_0}\right) \geq 8^0. \qquad [1]$$

Choosing the distance b according to eq. [1] allows preventing back-reflections from blocking surface 35 if blocking surface 35 is reflective. Any back-reflected beam 51 travels back at an angle of about 2β relative to the incident beam 50. Blocking surface 35 is preferably opaque or absorbing, but could in general be reflective. As shown, beam attenuator 32 can be rotated about axis 46 by angles φ larger than β, in order to impart a desired level of attenuation to beam 50.

FIGS. 4-A through 4-C show schematic views of the projection of light beam 50 and a beam attenuator 132 onto the yz plane, for three sequential positions 52a–c of beam attenuator 132. Beam attenuator 132 can be moved continuously between the illustrated positions. The projection of beam attenuator 132 is generally concavely-curving between its tip 138 and its proximal region 136. Part of beam attenuator 132 along its proximal region 136 can be convexly, outwardly curving. Beam attenuator 132 is mounted on a rotatable disk-shaped connecting part 42 as described above. In a first position illustrated as 52a, beam attenuator 132 does not substantially obstruct light beam 50. As beam attenuator 132 is rotated, it starts blocking light beam 50 to an extent determined by the extent of rotation and transverse position of beam attenuator 132. In a second, intermediate position 52b, beam attenuator 132 partially obstructs the passage of light beam 50. Finally, in a third position 52c, beam attenuator 132 allows substantially no light to pass through.

Figure 5:
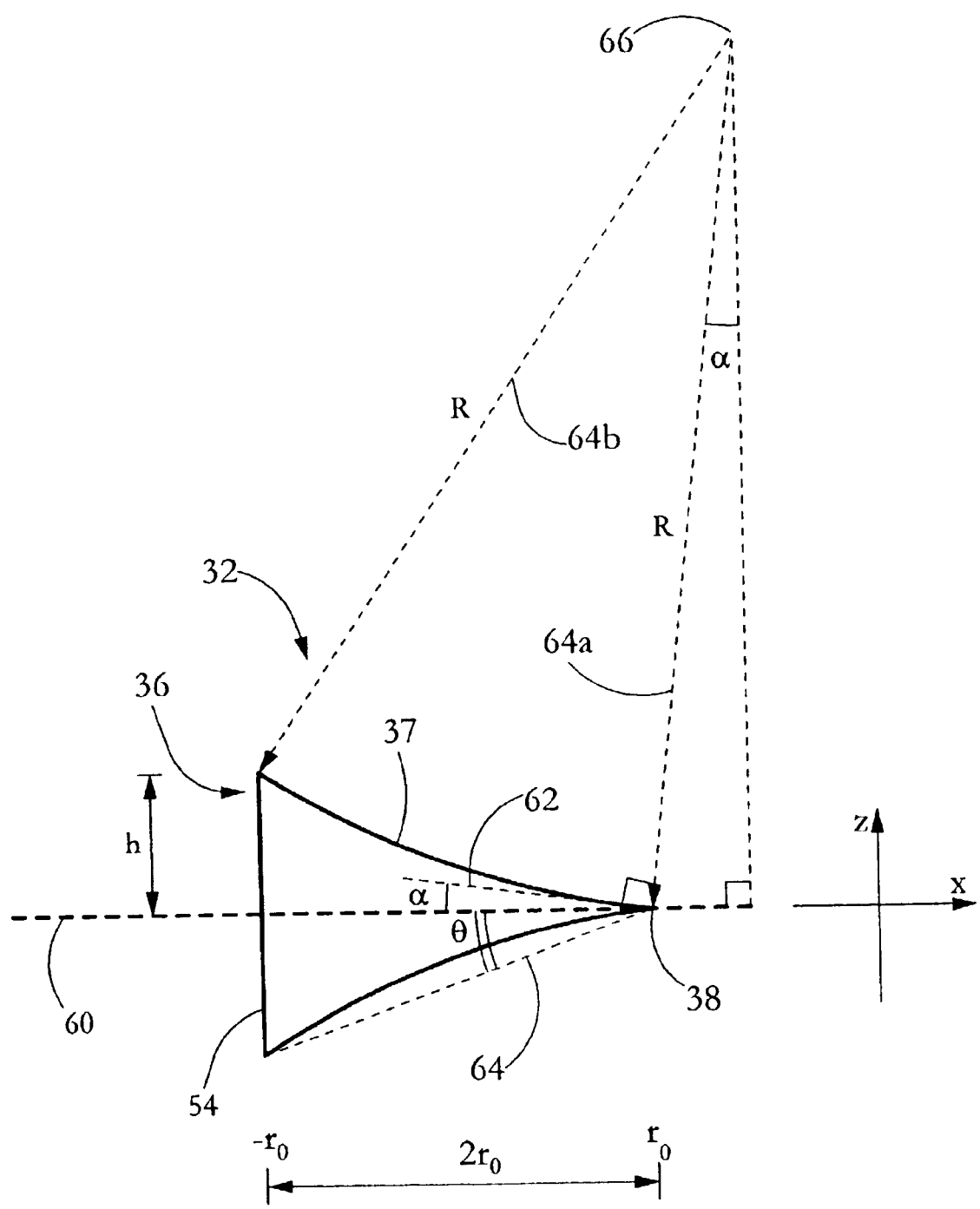
FIG. 5 shows a detailed view of the beam attenuator of FIGS. 3-A–D, according to the present invention.

FIG. 5 shows a detailed view of the projection of beam attenuator 32 onto the xz plane, according to the preferred embodiment of the present invention. The view of FIG. 5 is similar to that of FIG. 3-D. In the discussion below, consider a light beam propagating along the y-axis, which is perpendicular to the plane of the page in FIG. 5. Along the x-direction, beam attenuator 32 extends between an arcuate base 54 at the outermost end of proximal region 36 ($x=-r_0$), and distal tip 38 ($x=r_0$). In the z-direction, the projection of beam attenuator 32 is bounded by an inwardly-curving function $z=z(x)$, with $z(r_0)=0$ and $z(-r_0)=\pm h$. The function $z=z(x)$ characterizes the projections of the two symmetric edges 37 of light blocking surface 35. The projections of edges 37 are symmetric about a central axis 60 parallel to the x-axis. The boundary defined by the function $z=z(x)$ terminates at distal tip 38. The transverse extent 2h of beam attenuator 32 at base 54 determines the maximum attenuation imparted by beam attenuator 32. The transverse extent 2h is preferably at least as large as the radius of light beam 50 at the longitudinal location of beam attenuator 32. Distal tip 38 is much narrower than the radius of light beam 50.

A tip angle α is defined between central axis 60 and a tangent 62 to the projection of blocking edge 37 at tip 38 ($x=r_0$). In one implementation the tip angle α was chosen to be equal to about 9°. In another implementation the tip angle α was chosen to be equal to about 15°. A cone envelope angle θ is defined between central axis 60 and a conical envelope 64 extending linearly between the projection of the edge of base 54 and tip 38. The envelope angle θ is larger than the tip angle α, and conical envelope 64 laterally encloses blocking edges 37. The local angle formed between central axis 60 and the projection of each blocking edge 37 varies continuously along each blocking edge 37. The angle preferably increases continuously from tip 38 toward base 54, as shown in FIG. 5. The maximum angle between the projection of edge 37 and central axis 60 is preferably at base 54 ($x=-r_0$). The tip angle α affects the resolution of beam attenuator 32. A sharper tip angle α allows better attenuation resolutions. At the same time, reducing the tip angle α too much may require a relatively large radius $r_0$ for a given attenuator height h, beam size, and desired maximum attenuation.

In the presently preferred embodiment illustrated in FIG. 5, the projection of blocking surface 35 on the xz plane is bounded by two arcs of a circle 37 disposed symmetrically with respect to central axis 60. Each arc has a radius R, as illustrated in FIG. 5 by the radii 64a–b. As shown, the angle formed between radius 64a (corresponding to tip 38) and the normal to central axis 60 passing through the arc center is equal to the tip angle α. The coordinates ($x_c$, 0, $z_c$) of the arc center 66 are given by $$x_c = r_0 + R \sin \alpha, \; z_c = R \cos \alpha. \quad [2a]$$

Any point on blocking surface 58 must satisfy the equation $$(x-x_c)^2 + (z-z_c)^2 = R^2. \quad [2b]$$

Applying eqs. [2a] and [2b] to a surface base point of coordinates ($-r_0$, 0, h) yields $$R = \frac{4r_0^2 + h^2}{2h\cos\alpha - 4r_0 \sin\alpha}. \quad [2c]$$

Equation [2c] allows determining a suitable radius R for desired values of $r_0$, θ, and α. For example, for $r_0=2.75$ mm, θ=16.2°, h=1.6 mm, and α=8.7°, eq. [2c] yields R=21.7 mm.

Using the locally-cylindrical curvature showed in FIG. 5 for blocking surface 35 allows relatively convenient machining of circular arcs 37 on a numerically computer-controlled (CNC) machine. In alternative embodiments, blocking surface 35 may have a parabolic, hyperbolic, or other arcuate projection on the xz plane.

Consider now a single-mode light beam 50. The light intensity of such a beam is concentrated around its middle, and decays toward the edges. The normalized light intensity distribution of a single-mode light beam can be approximated by the Gaussian distribution $$I(x, y) = \frac{2}{\pi} \exp\left(-\frac{2(x^2 + y^2)}{w_0^2}\right) \quad [3]$$

where $w_0$ is the beam waist. The intensity distribution in eq. [3] is normalized to 1, i.e.

$$\int_{-\infty}^{\infty}\int_{-\infty}^{\infty} I(x, y) dx dy = 1. \quad [4]$$

A Monte Carlo method can be used to simulate light ray traces in order to obtain the blocked light intensity integrated over the blocking surface 35. In such a method, a light ray is randomly chosen around its beam center in the lab frame. The coordinates of this light ray are then transformed into the frame which is at rest with the rotating beam attenuator 32, since blocking surface 35 and edges 37 are best described in the rotating frame. Finally, whether or not the chosen light ray strikes blocking surface 35 is determined geometrically.

Figure 6:
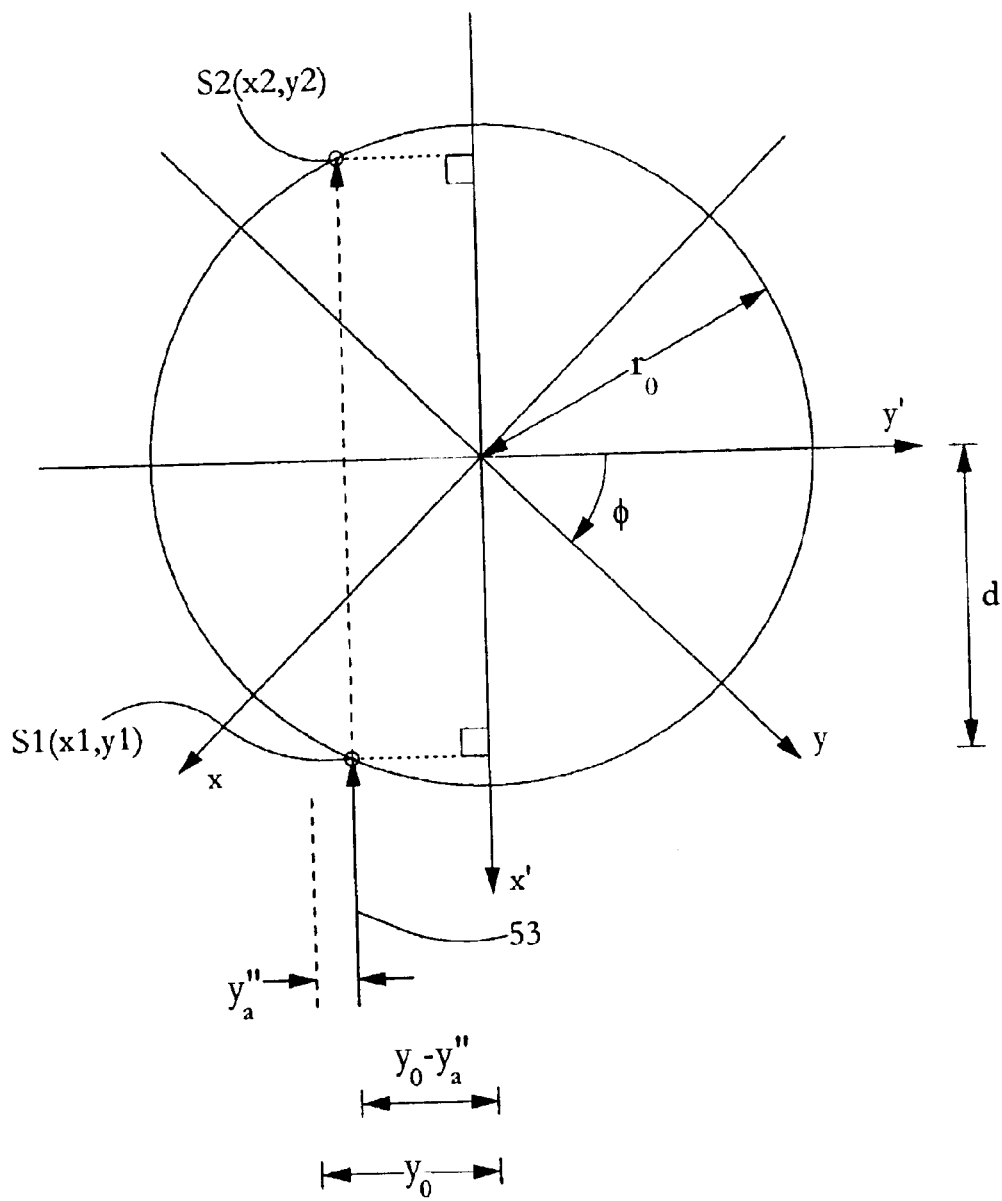
FIG. 6 illustrates the geometry of coordinate transformation between a fixed frame and a rotating beam attenuator frame, according to the present invention.

FIG. 6 illustrates the lab and beam attenuator frames in an x-y view similar to that of FIG. 3-B. In FIG. 6, the x'y'z' coordinates represent the fixed lab frame, while the xyz coordinates represent the rotating beam attenuator frame. Beam attenuator 32 and its rest frame xyz are rotated by an angle φ with respect to the original non-blocking beam attenuator position. The lab and beam attenuator frames coincide in the original beam attenuator position.

Consider a Gaussian beam centered at $y'=-y_0$, $z'=0$, traveling parallel to the x' axis, and a randomly-chosen light ray 53 situated at distance $y''=y_a''$ and $z''=z_a''$ away from the beam center. In the lab frame, this light ray is situated at $y'=y_a''-y_0$, $z'=z_a''$. As shown in FIG. 6, light ray 53 strikes the cylindrical surface defined by beam attenuator 32 at a point S1. The coordinates of point S1 in the rotating frame are $(x_1, y_1, z_1)$. Let the coordinates of point S1 in the fixed lab frame be $(d, y_a''-y_0, z_a'')$. These coordinates can be transformed in the rotating frame according to the equations:

$$z_1 = z_a'', \quad [5a]$$

$$x_1 = d \cos \phi + (y_0 - y_a'') \sin \phi, \quad [5b]$$

$$y_1 = d \sin \phi - (y_0 - y_a'') \cos \phi. \quad [5c]$$

$$d = \sqrt{r_0^2 - (y_0 - y_a'')^2}. \quad [5d]$$

For each light ray of interest, the coordinates $(x_1, y_1, z_1)$ for the corresponding point S1 are computed as described above. A given point S1 is located on beam blocking surface 35 if the following three conditions are satisfied:

$$|y_0 - y_a''| \leq r_0, \quad [6a]$$

$$y_1 \geq 0, \quad [6b]$$

$$|z_a''| \leq f(x_1) = z_c - \sqrt{R^2 - (x_1 - x_c)^2}. \quad [6c]$$

If a point S1 is located on beam blocking surface 35, its corresponding light ray is blocked by beam attenuator 32. The blocked light intensity $P_{block}$ is then accumulated into the desired value for the corresponding beam attenuator position. The blocked light intensity is computed according to the Gaussian intensity distribution of eq. [3]. After the steps above are performed for many light rays at each beam attenuator position of interest, a blocked light intensity $P_{block}(\phi)$ is generated for the rotation angles of interest $\phi$. The attenuation $\Gamma$, expressed in dB, can be written as a function of $\phi$ as:

$$\Gamma = -10 \log_{10}[1 - P_{block}(\phi)](dB). \quad [7]$$

Figure 7:
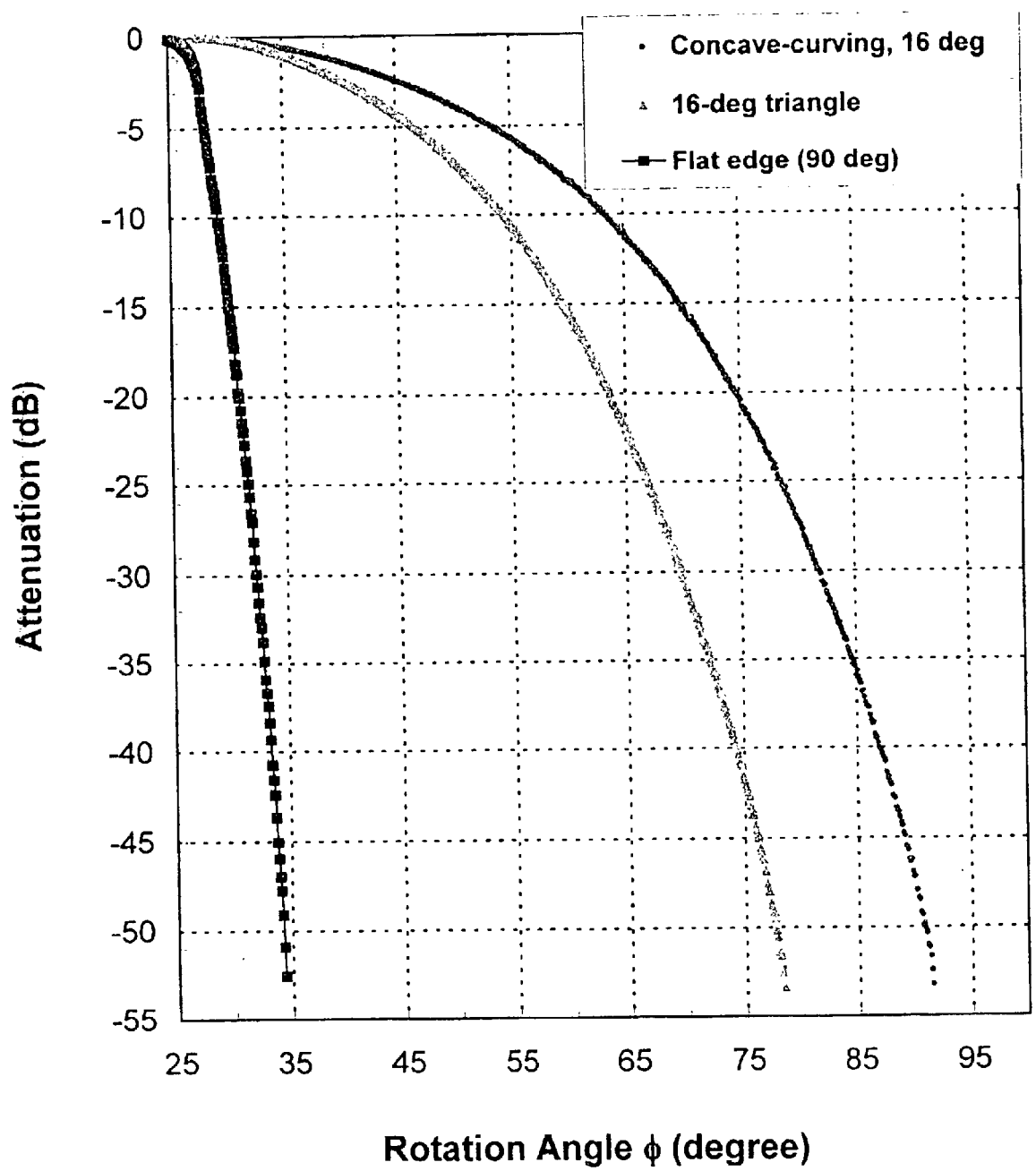
FIG. 7 shows numerically-calculated attenuation values for a single-mode light beam as a function of attenuator position (rotation angle) for an attenuator such as the one shown in FIGS. 3-A–D, and for a conical and a square attenuator.

FIG. 7 shows numerically calculated attenuations as functions of angular position $\phi$ for a beam attenuator 32 as described above, for $y_0=1.3$ mm, $r_0=2.75$ mm, $\theta=16.2°$, $\alpha=8.7°$, and a beam waist $w_0=0.14$ mm. Other parameters, derived from eqs. [2a–c], were: $h=1.6$ mm, $R=21.7$ mm, $x_c=6.0$ mm, $z_c=\pm 21.5$ mm. The numerical result at each angle $\phi$ corresponds to averaging performed over 256,000 Monte Carlo events (rays). For comparison, FIG. 7 also shows data for a flat (square) beam block and for a $\theta=16.2°$ cone (triangle) shaped as envelope 64. As the beam attenuator shape changes from conical to flat, the half-cone angle $\theta$ increases, the slope becomes steeper and the resolution decreases. Table 1 lists the computed slopes at the points corresponding to $-5$ dB and $-10$ dB attenuations for the concave beam attenuator described above, the $\theta=16.2°$ cone, and the flat edge:

TABLE 1

| Block shape | Concave tip | Conical tip | Flat Edge |
|---|---|---|---|
| $\theta$ | 16.2° | 16.2° | 90° |
| $\alpha$ | 8.7° | — | — |
| Slope @ $-5$ dB | $-0.367$ dB/deg | $-.489$ dB/deg | $-4.79$ dB/deg |
| Slope @ $-10$ dB | $-0.624$ dB/deg | $-0.778$ dB/deg | $-4.90$ dB/deg |

The resolution of the optical attenuator, defined as the change in intensity corresponding to the minimal adjustment, is equal to the slope multiplied by the minimal step $\Delta\phi$ of the rotation angle $\phi$. For a fixed $\Delta\phi$, the resolution is proportional to the slope. As Table 1 illustrates, the concave-projection geometry described above allows higher resolutions than similar-sized flat or conical geometries. For example, the resolution for a concave-projection, $\theta=16.2°$ attenuator is improved by a factor of 7.9–13.1 relative to a flat-edged attenuator. Similarly, the resolution shown in Table 1 for the $(\theta, \alpha)=(16.2°, 8.7°)$ concave-projection attenuator is improved by a factor of 1.25–1.33 relative to the corresponding resolution for a triangle-projection $\theta=16.20$ attenuator having the same overall dimensions. A commercially-available stepper motor with a minimal rotation step of 18°/256 or 0.07°/step can be used to achieve a resolution of 0.026 dB at $-5$ dB attenuation using a concave-projection attenuator as described above.

The concave-projection geometry described above also allows a reduction in the overall length of the attenuator, as compared with a conical geometry having the same tip angle and base width. For a conical geometry, a sharper angle $\theta$ requires a longer conical beam attenuator, since $r_0 = h/\tan\theta$ increases as $\theta$ decreases for a fixed h. For example, a cone with a half-angle $\theta=8.7°$ is about twice as long as a cone of the same radius but with a half-angle $\theta=16.2°$.

FIG. 8-A shows a three-dimensional view of a beam attenuator 232 according to another variation of the present invention. FIGS. 8-B, 8-C, and 8-D show corresponding projections of beam attenuator 232 onto the xy, yz, and zx planes, respectively. Beam attenuator 232 is formed by part of a cylinder 233. Beam attenuator 232 has a light-blocking surface 235 comprising two distinct regions: a proximal region 236 of constant height h, and a concavely-tapering distal region 239 extending between proximal region 236 and a sharp distal tip 238. Each of proximal region 236 and distal region 239 has an azimuthal (angular) extent of 90° $(\pi/2)$. Distal region 239 is bounded by two concavely-tapering, symmetrically-disposed edges 237. As discussed above, the incident light beam 50 can be separated from beam attenuator 236 by a distance b when beam attenuator 236 is in a position of least attenuation. The distance b can be chosen such that the angle 2$\beta$ between any reflected rays 51 and the incident light beam 50 is large enough that reflected rays 51 do not reach the source of light beam 50. Relative to the attenuator geometry shown in FIGS. 3-A–D, the geometry of FIGS. 8-A–D allows increased attenuation speeds, at the expense of reduced resolution.

Figure 9:
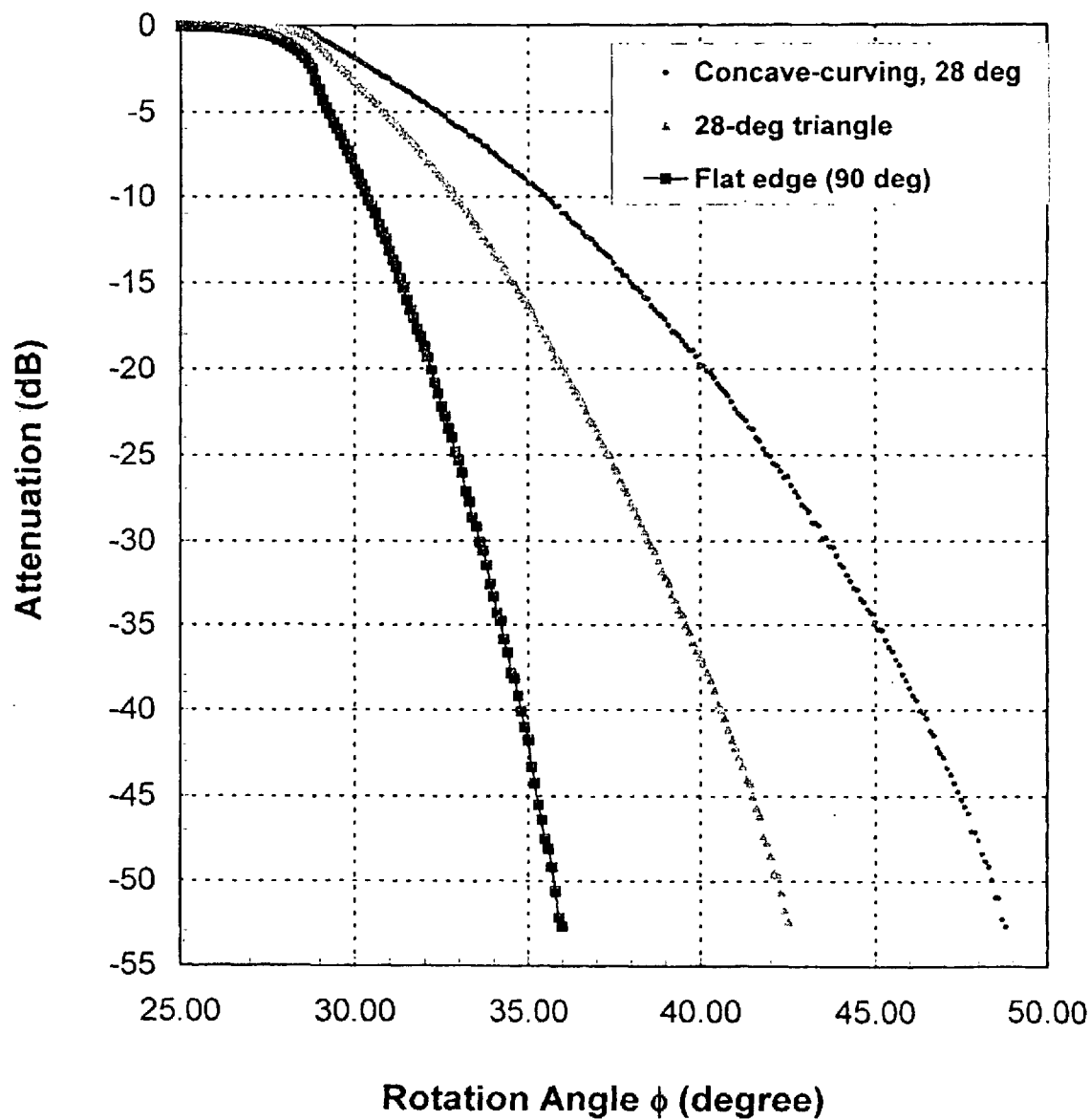
FIG. 9 shows numerically-calculated attenuation values for a single-mode light beam as a function of attenuator position (rotation angle) for an attenuator such as the one shown in FIGS. 8-A–D, and for a conical and a square attenuator.

FIG. 9 shows numerically-calculated attenuations as functions of angular position $\phi$ of a beam attenuator 232 such as the one shown in FIGS. 8-A–D, for $y_0=1.3$ mm, $r_0=2.65$ mm, $\theta=27.8°$, $\alpha=14.9°$, and a beam waist $w_0=0.14$ mm. Other parameters, derived from eqs. [2a–c], were: $h=1.4$ mm, $R=6.7$ mm, $y_c=-1.7$ mm, $z_c=\pm 6.4$ mm. The numerical result at each angle $\phi$ corresponds to averaging performed over 256,000 Monte Carlo events (rays). For comparison, FIG. 9 also shows data for a flat (square) beam block and for a $\theta=27.8°$ cone (triangle). As the beam attenuator shape changes from conical to flat, the half-cone angle $\phi$ increases, the slope becomes steeper and the resolution decreases. Table 1 lists the computed slopes at the points corresponding to $-10$ dB attenuations for the concave beam attenuator described above, the $0=27.8°$ cone, and the flat edge:

TABLE 2

| Block shape | Concave tip | Conical tip | Flat Edge |
|---|---|---|---|
| θ | 27.8° | 27.8° | 90° |
| α | 14.9° | — | — |
| Slope @ −10 dB | −1.77 dB/deg | −2.68 dB/deg | −4.90 dB/deg |

The resolution shown in Table 2 for the (θ, α)=(27.8°, 14.9°) concave-projection attenuator is improved by a factor of 1.5 relative to the corresponding resolution for a triangle-projection θ=27.8° attenuator having the same overall dimensions.

Figure 10:
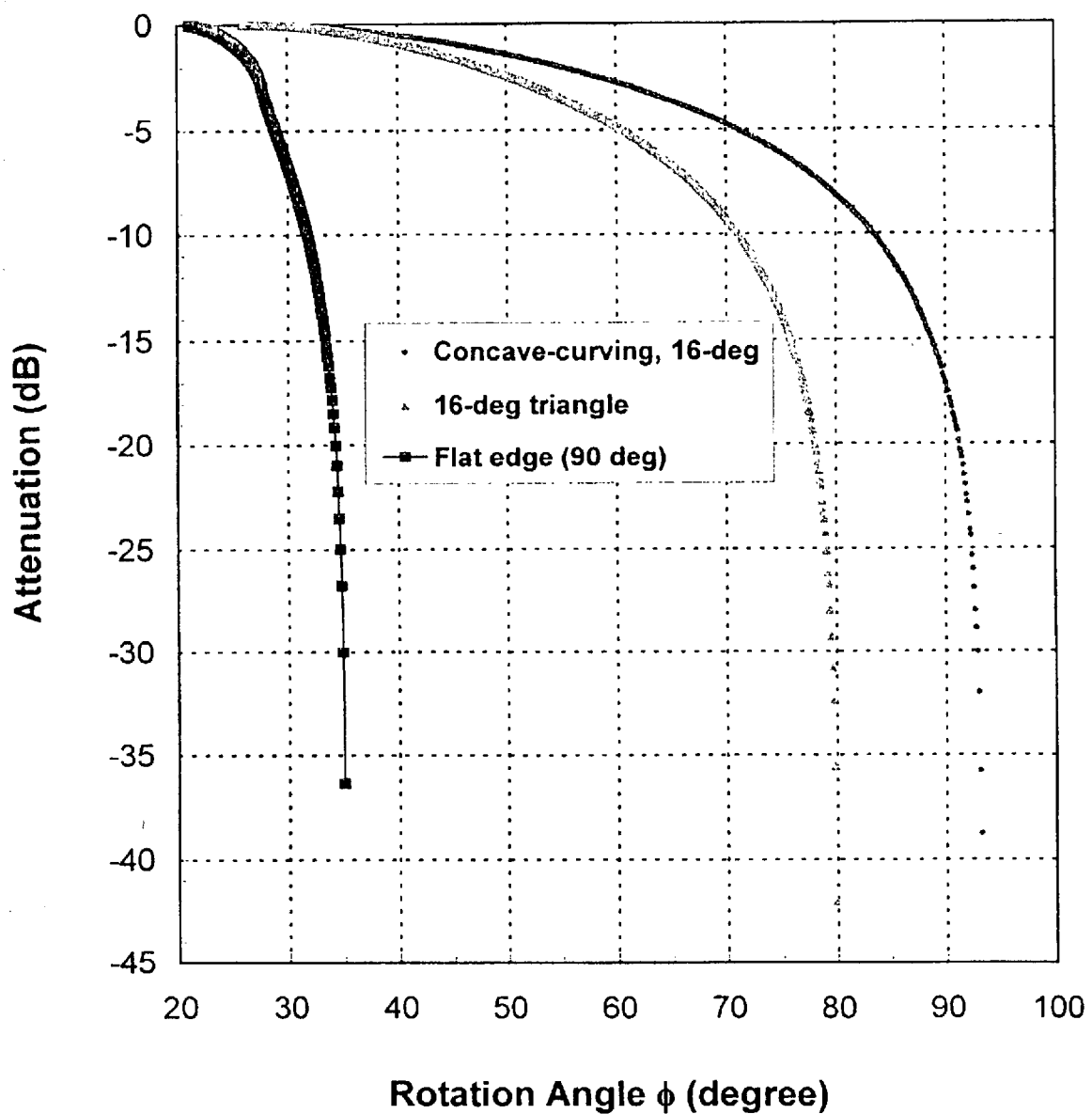
FIG. 10 shows numerically-calculated attenuation values for a multi-mode light beam as a function of attenuator position (rotation angle) for an attenuator such as the one shown in FIGS. 3-A–D, and for a conical and a square attenuator.

Concave-projection beam attenuators of the present invention also allow improved resolutions for multi-mode light beams. Multi-mode light beam have multiple spots of high intensity. When directed into free space, the multimode spots may spread out. For simplicity, a multimode intensity distribution can be approximated as a uniform light intensity distribution within a certain beam radius $R_0$. FIG. 10 shows numerically calculated attenuations as functions of beam attenuator position for a beam attenuator 32 as illustrated in FIGS. 3-A–D, for $y_0$=1.3 mm, $r_0$=2.75 mm, θ=16.2°, α=8.7°, and a multi-mode beam spot radius $R_0$=0.3 mm. Other parameters, derived from eqs. [2a–c], were: h=1.6 mm, R=21.7 mm, $x_c$=6.0 mm, $z_c$=±1.5 mm. For comparison, FIG. 10 also shows data for a flat (square) beam block and for a θ=16.2° cone (triangle) shaped as envelope 64. As the beam attenuator shape changes from conical to flat, the half-cone angle θ increases, the slope becomes steeper and the resolution decreases. Table 3 lists the computed slopes at the points corresponding to −10 dB attenuations for the concave beam attenuator described above, the θ=16.2° cone, and the flat edge:

TABLE 3

| Block shape | Concave tip | Conical tip | Flat Edge |
|---|---|---|---|
| θ | 27.8° | 27.8° | 90° |
| α | 14.9° | — | — |
| Slope @ −10 dB | −0.649 dB/deg | −0.925 dB/deg | −2.36 dB/deg |

The resolution shown in Table 3 for the (θ, α)=(16.2°, 9.7°) concave-projection attenuator is improved by a factor of 1.4 relative to the corresponding resolution for a triangle-projection θ=16.2° attenuator having the same overall dimensions.

Figure 11:
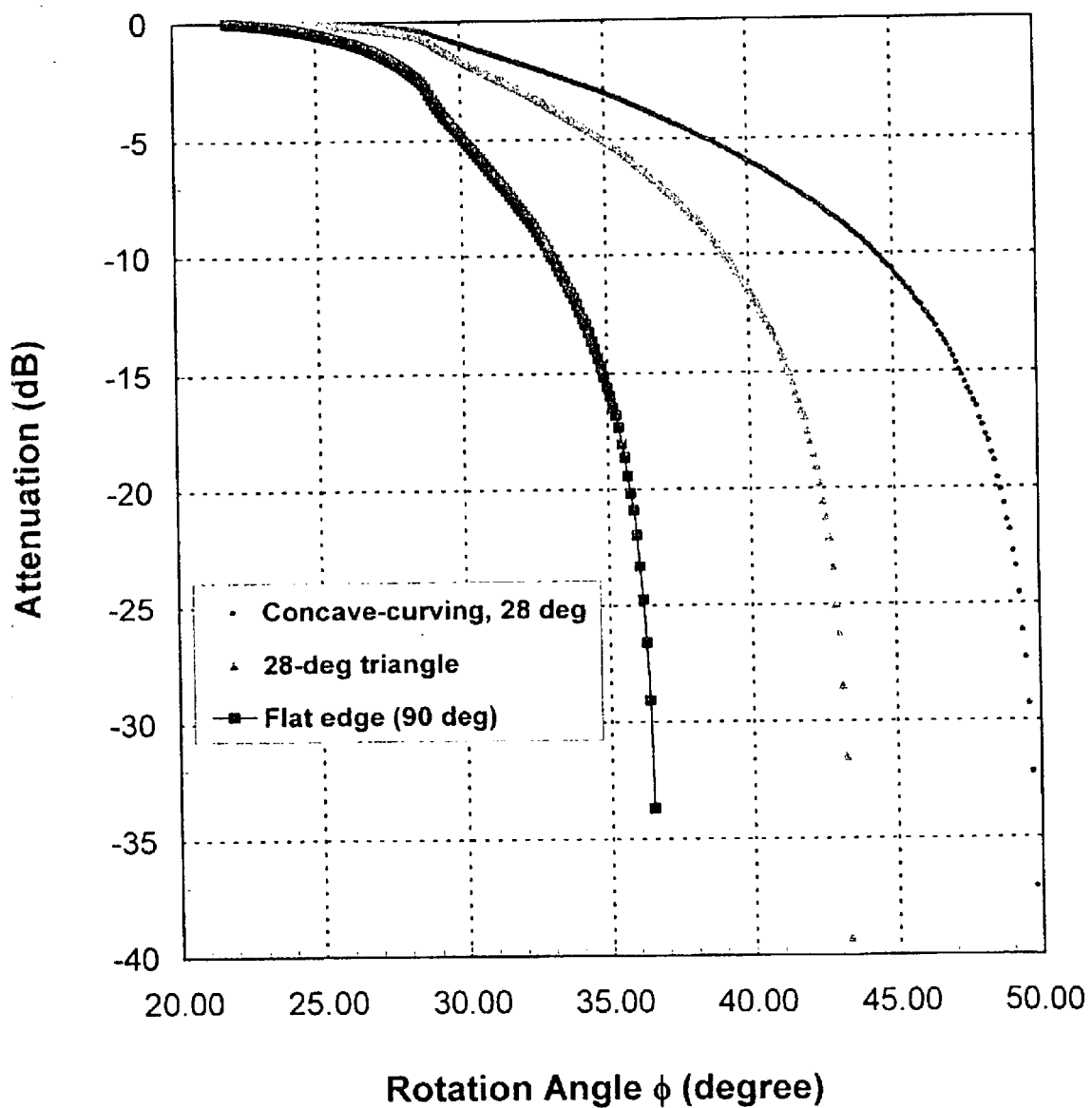
FIG. 11 shows numerically-calculated attenuation values for a multi-mode light beam as a function of attenuator position (rotation angle) for an attenuator such as the one shown in FIGS. 8-A–D, and for a conical and a square attenuator.

FIG. 11 shows numerically-calculated attenuations as functions of angular position ϕ of a beam attenuator 232 such as the one shown in FIGS. 8-A–D, for $y_0$=1.3 mm, $r_0$=2.65 mm, θ=27.8°, α=14.9°, and a multi-mode beam spot radius $R_0$=0.3 mm. Other parameters, derived from eqs. [2a–c], were: h=1.4 mm, R=6.7 mm, $y_c$=−1.7 mm, $z_c$=+6.4 mm. The numerical result at each angle ϕ corresponds to averaging performed over 256,000 Monte Carlo events (rays). For comparison, FIG. 11 also shows data for a flat (square) beam block and for a θ=27.8° cone (triangle). As the beam attenuator shape changes from conical to flat, the half-cone angle θ increases, the slope becomes steeper and the resolution decreases. Table 4 lists the computed slopes at the points corresponding to −10 dB attenuations for the concave beam attenuator described above, the θ=27.8° cone, and the flat edge:

TABLE 4

| Block shape | Concave tip | Conical tip | Flat Edge |
|---|---|---|---|
| θ | 27.8° | 27.8° | 90° |
| α | 14.9° | — | — |
| Slope @ −10 dB | −1.25 dB/deg | −1.78 dB/deg | −2.19 dB/deg |

The resolution shown in Table 4 for the (θ, α)=(27.8°, 14.9°) concave-projection attenuator is improved by a factor of 1.4 relative to the corresponding resolution for a triangle-projection θ=27.8° attenuator having the same overall dimensions.

FIGS. 12-A–C illustrate several variations in beam attenuator geometry suitable for use in the present invention. The figures show views of the projections onto the xy-plane of three beam attenuators 332, 432, 532, respectively. A beam attenuator 332 shown in FIG. 12-A has a filled-in volume. A beam attenuator 432 shown in FIG. 12-B forms part of a tube having an ellipsoidal xy projection/cross-section. Furthermore, a beam attenuator 532 shown in FIG. 12-C is asymmetric with respect to the x- and y-axes.

It will be clear to one skilled in the art that the above embodiments may be altered in many ways without departing from the scope of the invention. For example, various materials, optical components, and driving devices can be used in conjunction with the described beam attenuators. Suitable beam attenuators and associated control device components can be formed by monolithic structures or by assemblies of multiple distinct subcomponents. Other three-dimensional beam attenuator shapes than those described above can be used to produce the beam-blocking cross-sections described above. The mathematical calculations presented are for illustrative purposes only, and are not intended to limit the invention. Various well-known motors can be used to drive and control the motion of the beam attenuator. Accordingly, the scope of the invention should be determined by the following claims and their legal equivalents.

What is claimed is:

1. A variable optical attenuator for attenuating a longitudinal light beam, comprising:
a rotatable beam attenuator for attenuating the light beam, wherein
a projection of the beam attenuator onto a plane perpendicular to the light beam includes a proximal region, a distal tip, and a concave curved light-blocking surface extending between the proximal region and the distal tip,
the blocking surface narrows from the proximal region to the distal tip, and
an outer surface of the beam attenuator forms an azimuthally-tapering section of a cylindrical shell centered about a rotation axis perpendicular to the longitudinal light beam; and
a motor coupled to the beam attenuator, for rotating the beam attenuator about the rotation axis so as to vary an attenuation of the light beam caused by the beam attenuator.

2. The optical attenuator of claim 1, wherein the light-blocking surface has a boundary comprising an arc of a circle.

3. The optical attenuator of claim 2, wherein the narrowing of the blocking surface from the proximal region to the distal tip is defined by a boundary of a cylinder centered about an axis perpendicular to the rotation axis.

4. The optical attenuator of claim 1, wherein the proximal region includes a cylindrical-section region of constant extent along the rotation axis.

5. The optical attenuator of claim 1 wherein the light-blocking surface has a boundary shaped substantially as two arcs of a circle symmetrically disposed with respect to a transverse central axis of the beam attenuator.

6. The optical attenuator of claim 1 further comprising a first collimator and a second collimator positioned on opposite sides of the beam attenuator, for directing the light beam.

7. The optical attenuator of claim 1 wherein an angle formed between the light beam and the outer surface is larger than or equal to 8 degrees.

8. A variable optical attenuator for attenuating a longitudinal light beam, comprising a rotatable beam attenuator and a motor coupled to the beam attenuator for rotating the beam attenuator, wherein a projection of the beam attenuator onto a plane perpendicular to the light beam comprises a proximal region, a distal tip, and a concave curved light-blocking surface extending between the proximal region and the distal tip.

9. A method of variably attenuating a longitudinal light beam, comprising the steps of:

directing the light beam onto a rotatable beam attenuator for attenuating the light beam, wherein
a projection of the beam attenuator onto a plane perpendicular to the light beam includes a proximal region, a distal tip, and a concave curved light-blocking surface extending between the proximal region and the distal tip,
the blocking surface narrows from the proximal region to the distal tip, and
an outer surface of the beam attenuator forms an azimuthally-tapering section of a cylindrical shell centered about a rotation axis perpendicular to the longitudinal light beam; and
rotating the beam attenuator about the rotation axis for varying an extent of the light blocking surface blocking the light beam.

10. The method of claim 9, wherein the light beam is a single-mode light beam.

11. The method of claim 9, wherein the light beam is a multi-mode light beam.

12. An optical system comprising:

an optical source for generating a light beam;
a variable optical attenuator optically connected to the light source, for receiving and variably attenuating the light beam, comprising:
a rotatable beam attenuator for attenuating the light beam, wherein
a projection of the beam attenuator onto a plane perpendicular to the light beam includes a proximal region, a distal tip, and a concave curved light-blocking surface extending between the proximal region and the distal tip,
the blocking surface narrows from the proximal region to the distal tip, and
an outer surface of the beam attenuator forms an azimuthally-tapering section of a cylindrical shell centered about a rotation axis perpendicular to the longitudinal light beam; and
a motor coupled to the beam attenuator, for rotating the beam attenuator about the rotation axis so as to vary an attenuation of the light beam caused by the beam attenuator; and
an optical receiver optically connected to the variable optical attenuator, for receiving the light beam after passage through the variable optical attenuator.

13. A variable optical attenuator for attenuating a longitudinal light beam, comprising:

an optical input for receiving the light beam;
an optical output for transmitting the light beam; and
a movable beam-blocking attenuator positioned in a path of the light beam between the optical input and the optical output, wherein, in a plane substantially perpendicular to a direction of propagation of the light beam at the attenuator, the attenuator has a projection having a proximal region, a distal tip, and a concave-curved boundary extending between the proximal region and the distal tip, the projection narrowing from the proximal region to the distal tip.

* * * * *